United States Patent
Keller

(10) Patent No.: US 6,770,235 B1
(45) Date of Patent: Aug. 3, 2004

(54) METHOD FOR ADJUSTING THE SHAPE OF A LOW FRICTION COATING ON A SPLINED SLIP JOINT MEMBER

(75) Inventor: Thomas J. Keller, Bristol, VA (US)

(73) Assignee: Torque-Traction Technologies, Inc., Maumee, OH (US)

( * ) Notice: Subject to any disclaimer, the term of this patent is extended or adjusted under 35 U.S.C. 154(b) by 584 days.

(21) Appl. No.: 09/728,934

(22) Filed: Dec. 1, 2000

(51) Int. Cl.$^7$ .................. B29C 59/02; B29C 59/04; B05D 3/12
(52) U.S. Cl. .............. 264/293; 264/320; 427/356; 427/359; 29/458; 29/527.2; 29/898.12; 425/385; 425/392; 118/110; 118/111; 118/112
(58) Field of Search ................................ 264/284, 293, 264/320; 427/356, 359; 29/898.12, 527.2, 458; 425/385, 392; 118/110, 111, 112

(56) References Cited

U.S. PATENT DOCUMENTS

| | | | |
|---|---|---|---|
| 2,798,391 A | | 7/1957 | Bennett .................. 72/126 |
| RE27,068 E | * | 2/1971 | Groves et al. .............. 464/162 |
| 4,528,148 A | * | 7/1985 | Dotti .................. 264/1.28 |
| 4,552,544 A | * | 11/1985 | Beckman et al. .......... 464/162 |
| 5,230,661 A | | 7/1993 | Schreiber et al. .......... 464/181 |
| 5,238,642 A | * | 8/1993 | Benquet et al. .......... 264/284 |
| 5,309,620 A | | 5/1994 | Shinohara et al. .......... 29/432 |
| 5,330,203 A | * | 7/1994 | Fleenor et al. ............ 279/46.3 |
| 5,601,493 A | | 2/1997 | Nakazono et al. .......... 464/181 |
| 5,720,102 A | * | 2/1998 | McClanahan .......... 29/898.12 |
| 5,903,965 A | | 5/1999 | Fletcher et al. ............ 29/458 |

FOREIGN PATENT DOCUMENTS

| | | | | |
|---|---|---|---|---|
| GB | 1220058 A | * | 1/1971 | ............ B44B/5/00 |
| GB | 2164761 | | 3/1986 | |
| JP | 01-010938 A | * | 1/1992 | .......... B41F/17/00 |
| SU | 1398990 A | * | 5/1988 | ............ B22F/7/04 |

* cited by examiner

Primary Examiner—Michael Colaianni
Assistant Examiner—Michael I. Poe
(74) Attorney, Agent, or Firm—MacMillan, Sobanski & Todd, LLC

(57) ABSTRACT

A method for re-shaping portions of a coating applied to the surface of a component using a tool including a collet having a plurality of flexible arms with a wheel rotatably supported on each of the flexable arms, a nut and a sleeve. The tool is initially installed by disposing the collet caxially about the component. Then, the sleeve is disposed co-axially about the collet. Next, the nut is threaded onto a threaded first end of the collet. As the nut is threaded onto the collet, it engages and moves the sleeve axially toward the arms of the collet thereby causing the arms to be compressed radially inwardly such that outer circumferential surfaces of the wheels engage and re-shape the coating on the outer surface of the component. The tool, as a whole, can then be moved axially back and forth along the surface of the component to re-shape the entire length of the coating thereon.

9 Claims, 3 Drawing Sheets

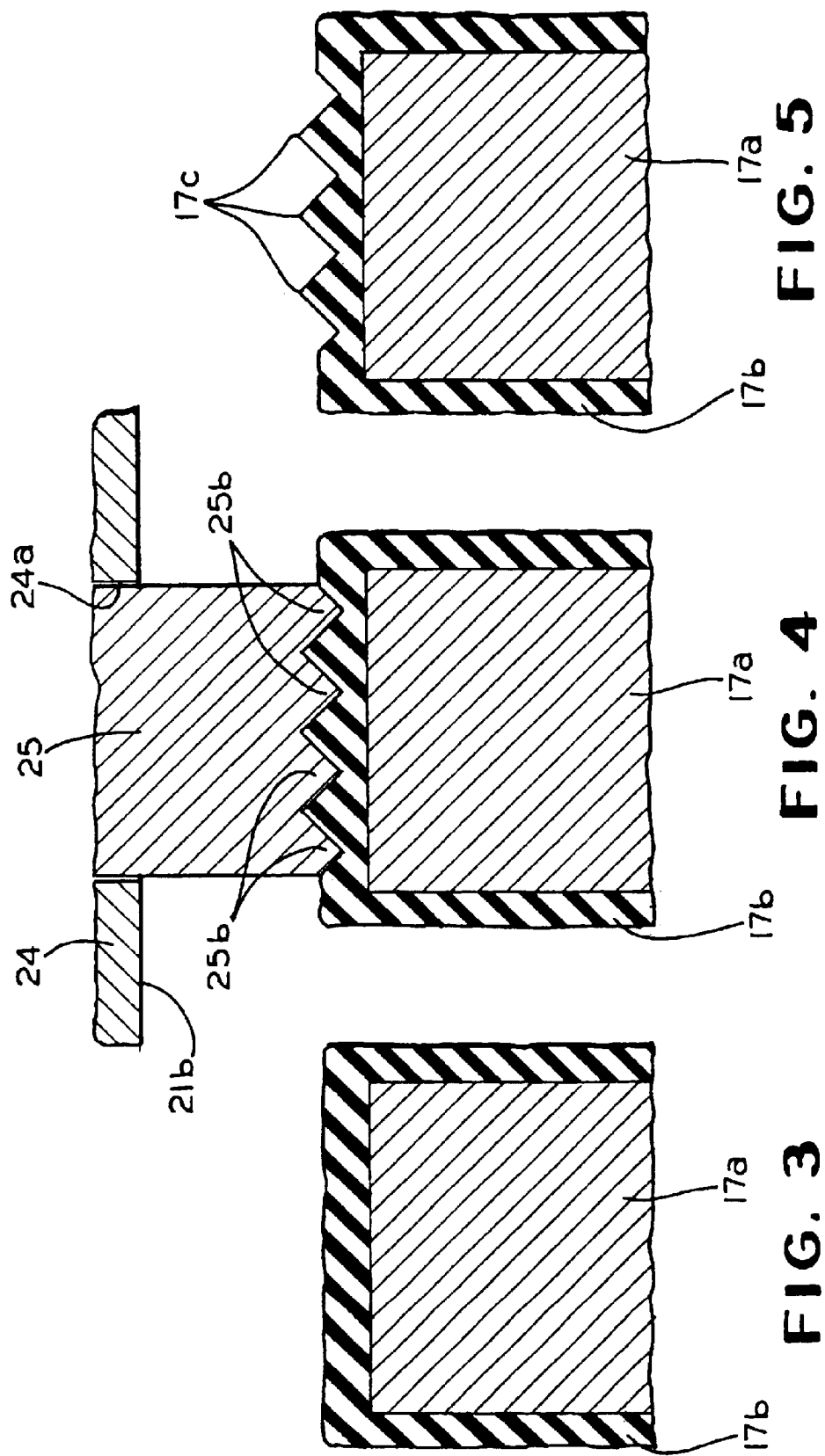

METHOD FOR ADJUSTING THE SHAPE OF A LOW FRICTION COATING ON A SPLINED SLIP JOINT MEMBER

BACKGROUND OF THE INVENTION

This invention relates in general to the manufacture of slip joints, such as are commonly used in vehicle drive train systems, for transmitting rotational force or torque between axially movable components. In particular, this invention relates to a method and apparatus for re-shaping portions of a low friction coating applied to the splines of one of such components in order to minimize broken back between the intermeshing splines of the axially movable components.

In most land vehicles in use today, a drive train system is provided for transmitting rotational power from an engine/transmission assembly to an axle assembly so as to rotatably drive one or more wheels of the vehicle. To accomplish this, a driveshaft assembly is usually connected between an output shaft of the engine/transmission assembly and an input shaft of the axle assembly. Typically, a first universal joint is connected between the output shaft of the engine/transmission assembly and a first end of the driveshaft assembly, while a second universal joint is connected between a second end of the driveshaft assembly and the input shaft of the axle assembly. The universal joints provide a rotational driving connection from the output shaft of the engine/transmission assembly through the driveshaft assembly to the input shaft of the axle assembly, while accommodating a limited amount of angular misalignment between the rotational axes thereof.

Not only must the drive train system accommodate a limited amount of angular misalignment between the engine/transmission assembly and the axle assembly, but it must also typically accommodate a limited amount of relative axial movement. A small amount of such relative axial movement frequently occurs when the vehicle is operated. To address this, it is known to provide one or more slip joints in the driveshaft assembly of the drive train system. A typical slip joint includes first and second splined members that are connected to respective components of the drive train system between the output shaft of the engine/transmission assembly and the input shaft of the axle assembly. The splined members cooperate with one another to provide a rotational driving connection between such components of the drive train system, while permitting a limited amount of relative axial movement therebetween.

As is well known in the art, one or both of the splined members may be coated with a material having a relatively low coefficient of friction. The low friction coating is provided to minimize the amount of force required to effect relative movement between the two splined members. Also, the low friction coating provides a relatively tight fit between the cooperating splines of the two splined members, thus minimizing any undesirable looseness therebetween while continuing to allow free axial movement.

A number of methods are known for applying the low friction coating to the splined members of the slip joint In one known method, the splined region of the slip joint member is first primed, then dipped into a molten bath of the low friction coating. In another known method, the splined region of the slip joint member is initially heated, then immersed in a bed containing a quantity of the low friction coating in particulate form. Alternatively, the splines can be coated electrostatically, wherein the low friction coating is applied in a particulate form. It is also known to apply the low friction coating by injection molding the low friction material between the assembled splined members.

One problem that has been experienced in connection with slip joints manufactured according to known methods is that even after the coating has been applied, an undesirable gap can still exist between adjacent splines formed on the cooperating members of the slip joint. These gaps can occur as a result of manufacturing tolerances in the formation of the individual splined members and the coating process and usually result in an undesirable amount of looseness between the splined members during operation. Looseness that occurs in the direction of rotation of the splined members, wherein one of the splined members can rotate slightly relative to the other splined member, is referred to as backlash. Looseness that occurs in the direction transverse to the direction of rotation of the slip joint, wherein one of the splined members can extend slightly at a cantilevered angle relative to the other splined member, is referred to as broken back. Known solutions to the problems of backlash and broken back have been found to be relatively difficult, costly, and time consuming to employ. Thus, it would be desirable to provide a method and apparatus for quickly and easily re-shaping portions of a low friction coating that has been applied to the splines of a component of a slip joint or other component in order to minimize such undesirable looseness.

SUMMARY OF THE INVENTION

This invention relates to a method and apparatus for re-shaping portions of a low friction coating applied to the surface of a component, such as to the outer surface of a spline formed on a component in a slip joint. The tool includes a collet having a first end that is threaded and a second end that is slotted to define a plurality of flexible arms. A wheel is rotatably supported on each of the arms of the collet. Portions of the outer circumferential surfaces of the wheels extend radially inwardly from the inner surface of the collet and are formed having a shape, such as plurality of circumferential ridges, that corresponds to the desired final shape for the coating applied to the surface of the component. The tool also includes a sleeve that is sized to be disposed co-axially about the collet. Preferably, the inner surface of the sleeve is sized to be slightly larger than the threaded first end of the collet, but slightly smaller than the arms of the second end thereof. Lastly, the tool includes a nut having an inner threaded surface that is sized to be threaded onto the threaded first end of the collet. The tool is initially installed by disposing the collet co-axially about the component. Then, the sleeve of the tool is disposed co-axially about the collet. Next, the nut is threaded onto the threaded first end of the collet. As the nut is threaded onto the collet, it engages the end of the sleeve and moves the sleeve axially toward the arms of the collet, causing the arms to be compressed radially inwardly toward one another such that the outer circumferential surfaces of the wheels engage the coating provided on the outer surface of the component. As a result, the coating is re-shaped to have an undulating or sawtooth cross sectional shape that corresponds to the shape of the outer circumferential surfaces of the wheels. The tool as a whole can then be moved axially back and forth along the surface of the component to re-shape the entire length of the coating thereon.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is a further enlarged sectional elevational view showing one of the splines of the slip tube shaft and the coating applied thereto prior to re-shaping by the tool illustrated in FIG. 2.

FIG. 4 is a sectional elevational view similar to FIG. 3 showing a portion of the tool illustrated in FIG. 2 engaging and adjusting the shape of the coating applied to the spline of the slip tube shaft.

FIG. 5 is a sectional elevational view similar to FIG. 4 showing the final adjusted shape of the coating applied to the spline of the slip tube shaft after the tool has been removed.

DETAILED DESCRIPTION OF THE PREFERRED EMBODIMENT

Figure 1:
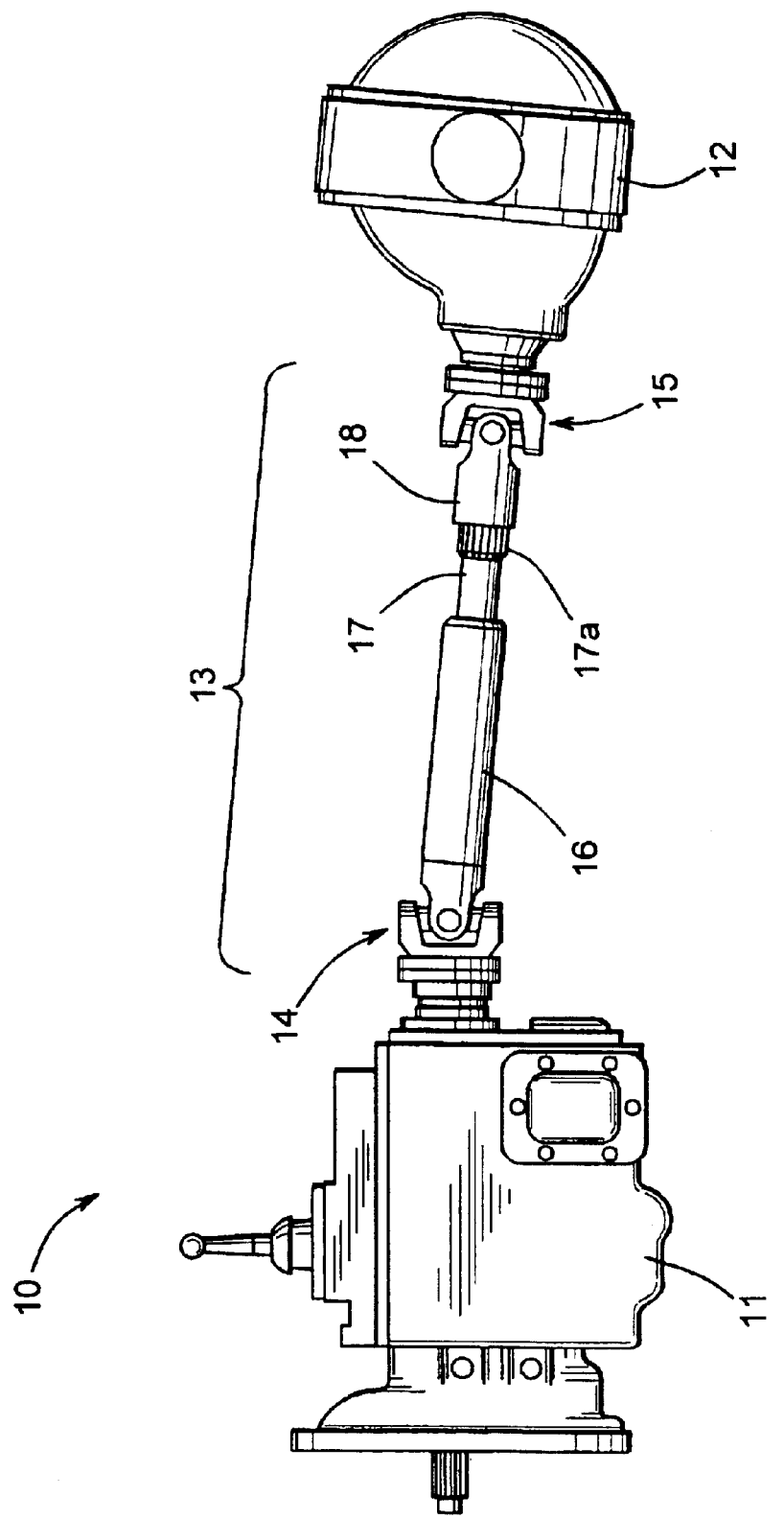
FIG. 1 is a side elevational view schematically illustrating a conventional vehicle drive train system including a slip joint manufactured using the method and apparatus of this invention.

Referring now to the drawings, there is illustrated in FIG. 1 a vehicle drive train system, indicated generally at 10, that is generally conventional in the art. The illustrated drive train system 10, which is intended to be representative of any type drive train system, vehicular or otherwise, includes a transmission 11 having an output shaft (not shown) that is connected to an input shaft (not shown) of an axle assembly 12 by a driveshaft assembly 13. The transmission 11 and the axle assembly 12 are conventional in the art. The driveshaft assembly 13 has a first end that is connected to the output shaft of the transmission 11 by a first universal joint assembly, indicated generally at 14. The driveshaft assembly 13 has a second end that is connected to the input shaft of the axle assembly 12 by a second universal joint assembly, indicated generally at 15.

The illustrated driveshaft assembly 13 includes a hollow cylindrical driveshaft tube 16 and a slip tube shaft 17. The driveshaft tube 16 has a first end that is connected to the first universal joint assembly 14 and a second end that is connected to a first end of the slip tube shaft 17. The slip tube shaft 17 has a second end that is formed or otherwise provided with a plurality of external splines 17a The splined end 17a of the slip tube shaft 17 extends within a hollow end portion of a slip yoke 18 that forms a part of the second universal joint assembly 15. The hollow end portion of the slip yoke 18 has a corresponding plurality of internal splines (not shown) formed therein that cooperate in a known manner with the external splines 17a formed on the slip tube shaft 17. As a result, a rotational driving connection is provided between the slip tube shaft 17 and the slip yoke 18, while a limited amount of relative axial movement is permitted therebetween.

As is well known in the art, the external splines 17a formed on the slip tube shaft 17 may be provided with a coating 17b (see FIGS. 3 through 5) of a material having a relatively low coefficient of friction. Such a low friction coating 17b can be provided to minimize the amount of force required to effect relative axial movement between the slip tube shaft 17 and the slip yoke 18, as described above. Also, the low friction coating 17b can provide a relatively tight fit between the external splines 17a of the slip tube shaft 17 and the internal splines of the slip yoke 18, thus minimizing any undesirable looseness therebetween, as also described above. In some instances, it may be desirable to apply a coating of a low friction material to the internal splines of the slip yoke 18, either in lieu of or in addition to the coating applied to the external splines 17a of the slip tube shaft 17. Although this invention will be described and illustrated in the context of the low friction coating 17b applied to the external splines 17a of the slip tube shaft 17, it will be appreciated that this invention may be practiced in connection with a low friction coating applied to the internal splines of the slip yoke 18. The coating 17b of the low friction material may be embodied as any desired material and may be applied in any desired manner, such as those mentioned above.

Figure 2:
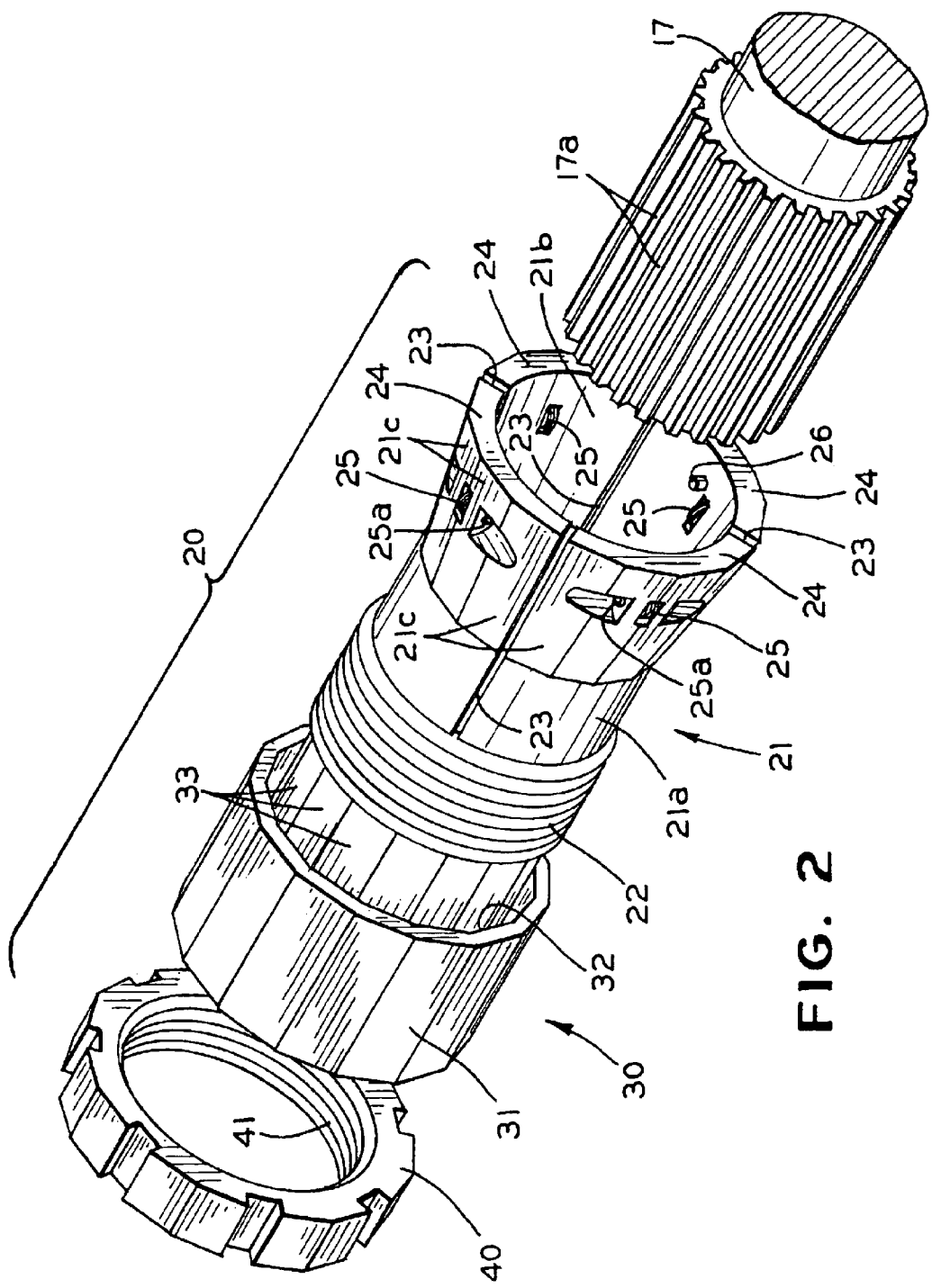
FIG. 2 is an enlarged exploded perspective view of a portion of a slip tube shaft illustrated in FIG. 1 together with a tool for adjusting the thickness of a low friction coating applied to the splines thereof.

Referring now to FIG. 2, there is illustrated a tool 20 for adjusting the thickness of the low friction coating 17b applied to the external splines 17a of the slip tube shape 17 in accordance with this invention. The tool 20 includes a collet, indicated generally at 21, that is generally hollow and cylindrical in shape, having an outer surface 21a and an inner surface 21b. The collet 21 includes a first end having a helical or similar threaded portion 22 formed in the outer surface 21a thereof. The collet 21 further includes a second end portion having a plurality of axially extending slots 23 formed therethrough so to define a plurality of flexible arms 24. In the illustrated embodiment, four equidistantly spaced slots 23 are formed through the second end portion of the collet 21, thereby defining four equally sized arms 24. However, it will be appreciated that this invention may be practiced having any desired number of slots 23 defining any desired number of arms 24. For example, three of such slots 23 may be formed through the second end of the collet 21 to define three arms 24. Furthermore, such slots 23 need not be equidistantly spaced, and the arms 24 need not be equally sized. Preferably, the arms 24 are tapered to extend slightly apart from one another, although such is not necessary. If desired, one or more flats 21c may be formed on the outer surface 21a of the collet 21. The purpose for such flats 21c will be explained below.

A mechanism is provided on the collet 21 for adjusting the shape of the coating applied to the external splines 17a of the slip tube shaft 17. In the illustrated embodiment, such coating adjusting mechanism includes a wheel 25 that is supported on each of the arms 24 of the second end of the collet 21. The wheels 25 are disposed in respective openings 24a (see FIG. 4) formed through the respective arms 24 of the second end of the collet 21 and are preferably supported for relative rotation on respective pins 25a (only two are illustrated) that are press fit or otherwise secured thereto. Portions of the outer circumferential surfaces of the wheels 25 extend radially inwardly from the inner surface 21b of the collet 21, as best shown in FIG. 4, for a reason that will be explained below. The outer circumferential surfaces of the wheels 25 are preferably formed having a shape that corresponds to the desired final shape for the coating applied to the external splines 17a of the slip tube shaft 17. In the illustrated embodiment, each of the circumferential surfaces of the wheels 25 is formed having a plurality of circumferentially extending ridges 25b (see FIG. 4). However, the circumferential surfaces of the wheels 25 may be formed having a plurality of transversely extending ridges or any other single or multiple protrusions having any desired shape. The purpose for such ridges 25b will also be explained below.

A mechanism is provided on the collet 21 for aligning the wheels 25 with the external splines 17a of the slip tube shaft 17. In the illustrated embodiment, such alignment mechanism includes a locating post 26 or similar structure that protrudes inwardly from the inner surface 21b of the collet 21. The illustrated locating post 26 is generally cylindrical in shape and is sized to fit between adjacent ones of the external splines 17a provided on the slip tube shaft 17. However, the locating post 26 may be formed having any desired shape. If desired, a plurality of such locating posts (not shown) may be provided. The purpose for the locating post 26 will be explained in greater detail below.

The tool 20 also includes a sleeve, indicated generally at 30, that is sized to be disposed co-axially about the collet 21. The illustrated sleeve 30 is generally hollow and cylindrical in shape, including an inner surface 31 and an outer surface 32. However, the sleeve 30 may be formed having any desired shape. If desired, one or more flats 33 may be formed on the inner surface 31 of the sleeve 30. The purpose for such flats 33 will be explained below. Preferably, the inner surface 32 of the sleeve 30 is sized to be slightly larger than the threaded portion 22 of the first end of the collet 21, but slightly smaller than the outwardly tapered arms 24 of the second end thereof. Lastly, the tool 20 includes a nut, indicated generally at 40, having an inner threaded surface 41. The nut 40 is sized to be threaded onto the threaded portion 22 of the first end of the collet 20 in the manner described below.

The operation of the tool 20 will now be described with reference to FIGS. 3, 4, and 5. FIG. 3 is an enlarged sectional elevational view showing one of the splines 17a of the slip tube shaft 17 and the coating 17b that has been applied thereto in a conventional manner. The purpose of the tool 20 is to re-shape a portion of such coating 17b to take up any looseness that occurs in the direction transverse to the direction of rotation of the slip joint, which is commonly referred to as broken back. As discussed above, when broken back is present in a slip joint, one of the splined members can undesirably extend at a cantilevered angle relative to the other splined member.

The tool 20 is initially installed by disposing the collet 21 co-axially about the splined end portion 17a of the slip tube shaft 17. To accomplish this, the locating post 26 of the collet 21 is first aligned with a space defined between two of the adjacent splines 17a provided on the slip tube shaft 17. Then, the collet 21 is moved co-axially about such splines 17a. The locating post 26 is positioned in such a manner relative to the coating adjusting wheels 25 that such wheels 25 are precisely aligned with the outer surfaces of some of the splines 17a when the collet 21 is disposed thereabout, as shown in FIG. 4. If the arms 24 of the collet 21 taper outwardly apart from one another as described above, the outer circumferential surfaces of the wheels 25 may not initially engage the coating 17b provided on the splines 17a as shown in FIG. 4, but rather may be radially spaced apart therefrom.

Regardless, the sleeve 30 of the tool 20 is next disposed co-axially about the collet 21. As mentioned above, the inner surface 32 of the sleeve 30 is preferably sized to be slightly larger than the threaded portion 22 of the first end of the collet 21, but slightly smaller than the outwardly tapered arms 24 of the second end thereof. As a result, the sleeve 30 can be easily inserted about the threaded portion 22 of the collet 21 until it abuts the outwardly tapering arms 24 thereof. The flats 33 provided on the sleeve 30 cooperate with the flats 21c provided on the collet 21 to prevent relative rotation from occurring.

Next, the inner threaded surface 41 of the nut 40 is threaded onto the threaded portion 22 of the collet 21. As the nut 40 is threaded onto the collet 21, it engages the end of the sleeve 30 and moves the sleeve 30 axially toward the outwardly tapered arms 24 of the collet 21. Consequently, the arms 24 are compressed radially inwardly toward one another such that the outer circumferential surfaces of the wheels 25 may positively engage the coating 17b provided on the splines 17a, as shown in FIG. 4. As discussed above, each of the circumferential surfaces of the wheels 25 is formed having a plurality of circumferentially extending ridges 25b. As the arms 24 are compressed inwardly by the sleeve 30, the ridges 25b are moved deeper into the portion of the coating 17b applied to the outer surface of the spline 17a. As a result, such portion of the coating 17b is re-shaped to have an undulating or sawtooth cross sectional shape that corresponds to the shape of the outer circumferential surfaces of the wheels 25. The rotation of the nut 40 onto the threaded portion 22 of the collet 21 continued until the wheels 25 are located in desired positions relative to the associated splines 17a. Typically, this can be accomplished visually by an operator. If desired, however, indicia (not shown) may be provided on the outer surface 21a of the collet 21 and on the nut 40 to provide a more readily perceptible indication of when rotation of the nut 40 should be ceased.

Once this position has been established, the tool 20 as a whole can be moved axially back and forth along the length of the splined end portion 17a of the slip tube shaft 17. As a result, the entire axial length (or, if desired, only a portion of such entire axial length) of the coating 17b applied to the outer surface of the spline 17a is re-shaped to have the undulating or sawtooth cross sectional shape. When the process is completed, the tool 20 is removed from the splined end 17a of the slip tube shaft 17 and disassembled for future use.

It will be appreciated that only a few of such splines 17a of the slip tube shaft 17 (i.e., those splines that are engaged by the wheels 25) are re-shaped in this manner.

The other splines 17a are not re-shaped by the axial movement of the tool 20. If desired, the tool 20 can be removed, indexed rotationally, and re-inserted about the splined end portion 17a of the slip tube yoke 17 in order to re-shape the coatings 17b on some of the other splines 17a. However, it has been found to be generally sufficient to re-shape only a few of such splines 17a in order to minimize broken back. The re-shaped coating 17b has been found to retain its shape during use.

Although this invention has been described and illustrated in the context of a tool for adjusting the shape of a low friction coating applied to splined component, it will be appreciated that this invention may be used to adjust the shape of any type of coating applied to any type of component. For example, the coating need not be applied to the component for the purpose lowering the amount of friction between it and another component, but rather may be applied to the component for any desired purpose. Similarly, the coating need not be applied to a splined component, but rather may be applied to any type of component having any desired shape.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for re-shaping a coating applied to a surface of a component comprising the steps of:
   (a) providing a collet including an end portion having an arm that carries a coating adjusting mechanism;
   (b) disposing the collet about the surface of the component; and
   (c) engaging a sleeve with the collet so as to move the coating adjusting mechanism into engagement with the coating applied to the surface of the component to re-shape the coating on the surface of the component.

2. The method defined in claim 1 further including a step (d) of moving the collet and the sleeve relative to the component such that the coating adjusting mechanism engages and shapes the coating along the surface of the component.

3. The method defined in claim 1 wherein said step (a) is performed by providing a collet including an end portion having a plurality of arms, each of which carries a coating adjusting mechanism.

4. The method defined in claim 1 wherein said step (a) is performed by providing a collet having an alignment mechanism adapted to engage the component for aligning the coating adjustment mechanism with the surface of the component.

5. The method defined in claim 1 wherein said step (a) is performed by providing a collet having a threaded surface, and wherein said step (c) is performed by threading a nut onto the threaded surface of the collet to engage the sleeve so as to move the coating adjustment mechanism into engagement with the coating applied to the surface of the component.

6. The method defined in claim 1 wherein said step (a) is performed by providing a coating adjusting mechanism including a wheel that is rotatably supported an said arm.

7. The method defined in claim 6 wherein said step (a) is performed by providing a wheel that has a protrusion formed on an outer circumferential surface thereof.

8. The method defined in claim 6 wherein said step (a) is performed by providing a wheel that has a circumferentially extending ridge formed on an outer circumferential surface thereof.

9. The method defined in claim 6 wherein said step (a) is performed by providing a wheel that has a plurality of circumferentially extending ridges formed on an outer circumferential surface thereof.

* * * * *